No. 624,231. Patented May 2, 1899.
D. G. MARTIN.
BICYCLE RACK.
(Application filed Oct. 23, 1897.)
(No Model.)
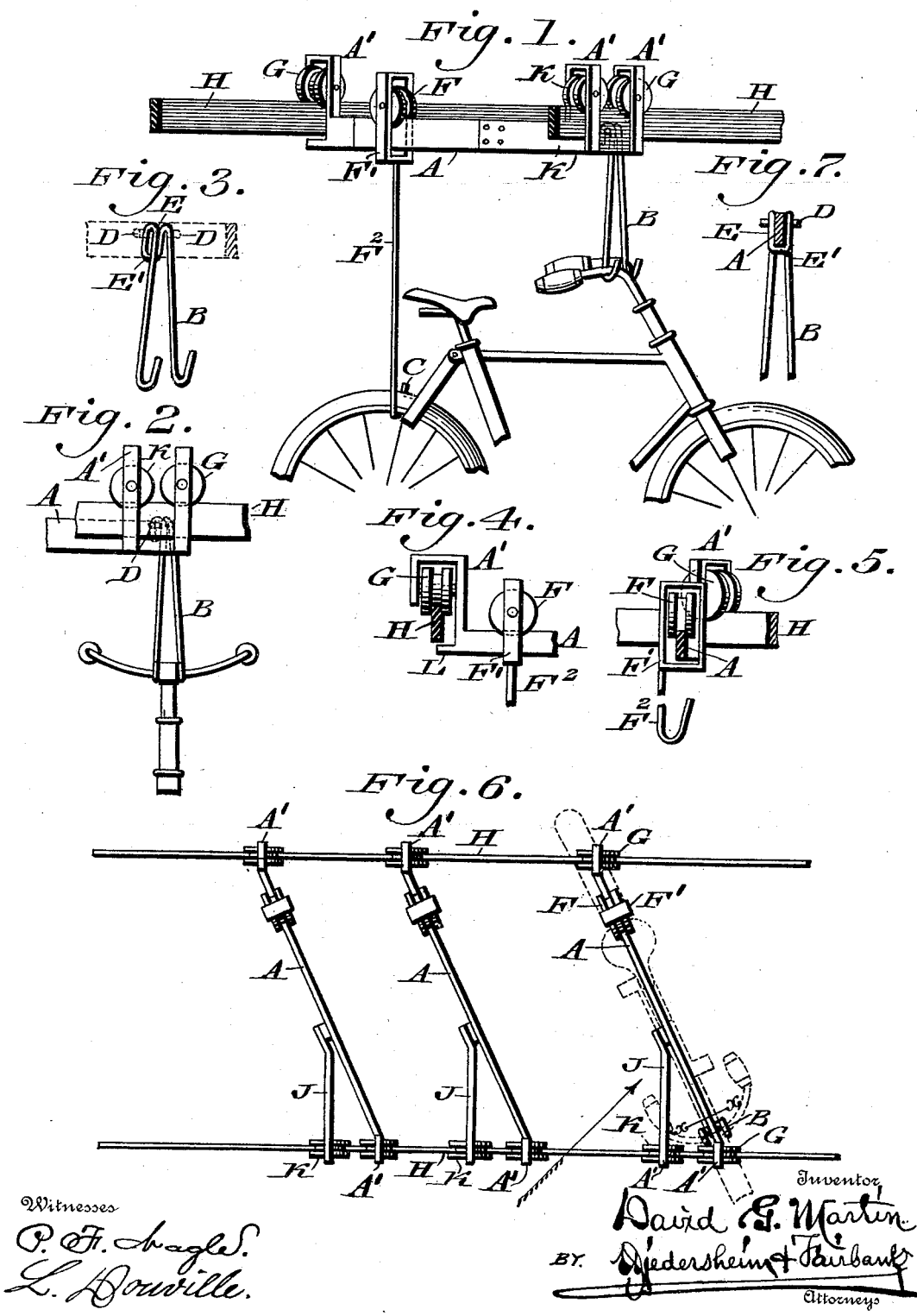

UNITED STATES PATENT OFFICE.

DAVID G. MARTIN, OF PHILADELPHIA, PENNSYLVANIA.

BICYCLE-RACK.

SPECIFICATION forming part of Letters Patent No. 624,231, dated May 2, 1899.

Application filed October 23, 1897. Serial No. 656,149. (No model.)

*To all whom it may concern:*

Be it known that I, DAVID G. MARTIN, a citizen of the United States, residing in the city and county of Philadelphia, State of Pennsylvania, have invented a new and useful Improvement in Bicycle-Racks, which improvement is fully set forth in the following specification and accompanying drawings.

My invention consists of a rack for suspending and supporting bicycles overhead, the same embodying a rail, a movable trolley, and a stationary hook, which are adapted to engage the bicycle and are rendered adjustable to different lengths of bicycles, said trolley permitting the bicycle to be moved toward one end of the rail to the required extent preparatory to the attachment of a stationary hook, whereby improper subsequent movement of the suspended bicycle is prevented. The stationary hook is double and has on the upper ends of its shanks a loop, the same being so constructed as to partially engage with a pin on the rail and partially with said rail, whereby it is coupled with the rail in such manner as to be comparatively an immovable fixture thereof, as will be hereinafter described.

Figure 1 represents a sectional side elevation in the direction of the arrow, Fig. 6, of a portion of a bicycle-rack embodying my invention. Fig. 2 represents a front view of a part thereof. Fig. 3 represents a detached portion thereof. Fig. 4 represents a partial side elevation and partial vertical section of another portion thereof. Fig. 5 represents a view of the parts shown in Fig. 4 at a right angle thereto. Fig. 6 represents a top or plan view. Fig. 7 represents a vertical section of a portion of the rack on line $x\,x$, Fig. 6, on an enlarged scale.

Similar letters of reference indicate corresponding parts in the figures.

Referring to the drawings, A designates a rail which has depending therefrom the hooks B and C, the hook B being connected with said rail by means of the pin D, which is secured to said rail and receives the loop or eye E on the upper end of said hook B, whereby the latter is firmly connected with said rail and constitutes a stationary fixture thereof. The hook C has on its upper end the pulley F, which constitutes a trolley adapted to run on the rail A, so as to be moved to and from the hook B, it being noticed that the hooks are adapted to engage with proper parts of the frame, wheels, &c., of the bicycle, the hook B in the present case being double and catching on the handle-bar and the hook C engaging the rear wheel, thus supporting the bicycle in an elevated position, it being also noticed that owing to the movable nature of the hook C the same may be adjusted relatively to the hook B, so as to adapt the hooks to support bicycles of different lengths.

Mounted on bearing-pieces A' on the ends of the rails are the axes of the wheels or pulleys G, which run on the secondary tracks H, by which provision a number of rails may be sustained on said tracks, and when a number of bicycles are to be supported they may be moved closely to each other, so as to adapt them to be stored in compact form and moved to the right or left on said tracks and separated from each other, as desired.

In order to strengthen the rails A, there are connected with the same the braces J, whose outer ends have mounted on them the auxiliary rollers or pulleys K, which, with the rails A and rollers or pulleys H, form trolleys which may easily run on the tracks H, and owing to the broad surfaces formed by the same are prevented from overturning sidewise and so retain their position thereon.

Projecting laterally from the ends of the rail A and beneath the tracks H are feet L, which move with the rail for guarding said rail from upward displacement.

In order to gain space in transverse direction, the rails A are placed in oblique positions to the longitudinal direction of the tracks, as shown in Fig. 6, thus permitting longer rails to be employed.

It will be evident that when the bicycles are raised they clear the engaging portions of the hooks B and C and so are disconnected therefrom, the rails or trolleys being prevented from rising on the tracks owing to the guards L.

It will here be noticed that the roller F, which, with the shank $F^2$ of the hook C, forms a trolley movable on the rail A, has its axis mounted on the bearing-piece F', which encircles the rail A and prevents the roller of said trolley from being raised from the rail. Now when the bicycle is hung on the hook C the trolley is moved toward one end of the rail, thus bringing the handle-bars or other proper portion of the bicycle beneath the hooks B. Then said portion is hung on said hooks B, and as the latter are immovable the bicycle is prevented from being improperly shifted or changed in its place of hanging, although its rear portion is hung on the said trolley, the latter also permitting the hooks to be applied to bicycles of variable lengths. As has been stated, the loop or eye E on the upper ends of the hooks B is connected with the rail A by means of the pins D on said rail, and the lower members of said loop are connected by the cross-bar F', which bears upwardly against the under side of said rail and consequently prevents the elevation of the hooks, while the pins D prevent downward displacement thereof. Consequently said hooks B remain stationarily suspended as a fixture of the rail, although the opposite suspending-hook C is adapted to rotate on the rail as a movable member thereof, as has been stated. Furthermore, the hooks B comprise two members for attachment to the bicycle at different places thereof, said members being continuous of the loop B and cross-bar E' as an integral construction which is light, inexpensive, and durable.

Having thus described my invention, what I claim as new, and desire to secure by Letters Patent, is—

An elevated rail and a support therefor, a movable trolley thereon with a depending hook and a pin on said rail, in combination with a double hook having a loop on the upper ends of the shanks thereof, said loop being hung on said pin, and the bottom of the side members of said loop being connected by a cross-bar which rests against the under side of said rail.

DAVID G. MARTIN.

Witnesses:
FRANKLIN J. L. BACHERT,
EDMUND L. MCCURDY.